US008789187B1

(12) United States Patent  
Pennington et al.

(10) Patent No.: US 8,789,187 B1  
(45) Date of Patent: Jul. 22, 2014

(54) PATTERN TRACKING AND CAPTURING HUMAN INSIGHT IN A WEB APPLICATION SECURITY SCANNER

(75) Inventors: William Pennington, San Jose, CA (US); Jeremiah Grossman, San Jose, CA (US); Robert Stone, Mountain View, CA (US); Siamak Pazirandeh, San Diego, CA (US)

(73) Assignee: Whitehat Security, Inc., Santa Clara, CA (US)

( * ) Notice: Subject to any disclaimer, the term of this patent is extended or adjusted under 35 U.S.C. 154(b) by 1214 days.

(21) Appl. No.: 11/864,787

(22) Filed: Sep. 28, 2007

Related U.S. Application Data

(60) Provisional application No. 60/827,410, filed on Sep. 28, 2006.

(51) Int. Cl.  
*H04L 29/06* (2006.01)  
*G06F 11/36* (2006.01)  
*G06F 11/263* (2006.01)  
*G06F 21/57* (2013.01)

(52) U.S. Cl.  
CPC .......... *G06F 11/3672* (2013.01); *G06F 11/263* (2013.01); *G06F 21/577* (2013.01)  
USPC .................... 726/25; 726/22; 726/23; 726/24

(58) Field of Classification Search  
CPC ............. H05K 999/99; H04L 63/1416; H04L 63/1408; H04L 63/145; H04L 63/1433; G06F 21/56; G06F 21/577; G06F 11/3672; G06F 11/261; G06F 11/236; G06F 11/2268; G06F 11/2635  
USPC .......... 726/22, 23, 24, 25, 26; 714/25, 32, 33, 714/45, 46  
See application file for complete search history.

(56) References Cited

U.S. PATENT DOCUMENTS

| | | |
|---|---|---|
| 4,636,198 A | 1/1987 | Stade |
| 4,976,696 A | 12/1990 | Sanderson |
| 5,279,569 A | 1/1994 | Neer et al. |
| 5,383,858 A | 1/1995 | Reilly et al. |
| 5,429,602 A | 7/1995 | Hauser |
| 5,520,653 A | 5/1996 | Reilly |
| 5,814,015 A | 9/1998 | Gargano et al. |
| 5,947,929 A | 9/1999 | Trull |
| 5,997,502 A | 12/1999 | Reilly et al. |
| 6,080,136 A | 6/2000 | Trull et al. |
| 6,090,064 A | 7/2000 | Reilly et al. |

(Continued)

OTHER PUBLICATIONS

Requirement for Restriction/Election for U.S. Appl. No. 12/702,783, mailed on Jan. 9, 2012, 7 pages.

*Primary Examiner* — Eleni Shiferaw  
*Assistant Examiner* — Hilary Branske  
(74) *Attorney, Agent, or Firm* — Davis Wright Tremaine LLP

(57) ABSTRACT

An apparatus and method of managing vulnerability testing of a web application is provided for running a set of one or more scripted tests against a web application, recording results of the one or more scripted tests, providing an interface for a human evaluator to review the recorded results, and accepting from the human evaluator custom test parameters based on observations of the recorded results, wherein custom test parameters include at least one context usable by a future tester in deciding whether to run the custom test, and also includes at least one instruction for automatically running custom test steps of the custom test.

26 Claims, 3 Drawing Sheets

(56) References Cited

U.S. PATENT DOCUMENTS

| | | |
|---|---|---|
| 6,312,410 B1 | 11/2001 | Yamamoto |
| 6,402,717 B1 | 6/2002 | Reilly et al. |
| 6,402,718 B1 | 6/2002 | Reilly et al. |
| 6,475,192 B1 | 11/2002 | Reilly et al. |
| 6,685,678 B2 | 2/2004 | Evans et al. |
| 6,733,478 B2 | 5/2004 | Reilly et al. |
| 6,775,824 B1* | 8/2004 | Osborne, II et al. .......... 717/125 |
| 6,808,513 B2 | 10/2004 | Reilly et al. |
| 7,018,363 B2 | 3/2006 | Cowan et al. |
| 7,028,223 B1* | 4/2006 | Kolawa et al. ................. 714/38 |
| 7,029,459 B2 | 4/2006 | Reilly |
| 7,081,105 B2 | 7/2006 | Reilly |
| 2002/0010855 A1* | 1/2002 | Reshef et al. ................. 713/164 |
| 2003/0065287 A1 | 4/2003 | Spohn et al. |
| 2003/0159063 A1* | 8/2003 | Apfelbaum et al. .......... 713/200 |
| 2004/0096313 A1 | 5/2004 | Harvey et al. |
| 2004/0116861 A1 | 6/2004 | Trocki et al. |
| 2005/0086643 A1* | 4/2005 | Shane ........................... 717/124 |
| 2005/0138426 A1* | 6/2005 | Styslinger .................... 713/201 |
| 2005/0154939 A1* | 7/2005 | De Pauw et al. ................ 714/25 |
| 2005/0166094 A1* | 7/2005 | Blackwell et al. .............. 714/38 |
| 2005/0251863 A1* | 11/2005 | Sima ............................... 726/25 |
| 2006/0069671 A1* | 3/2006 | Conley et al. .................... 707/3 |
| 2006/0212941 A1* | 9/2006 | Bronnikov et al. ............. 726/24 |
| 2006/0225124 A1* | 10/2006 | Kolawa et al. ..................... 726/1 |
| 2006/0259973 A1* | 11/2006 | Sima et al. ...................... 726/25 |
| 2006/0277606 A1* | 12/2006 | Yunus et al. .................... 726/25 |
| 2006/0282494 A1* | 12/2006 | Sima et al. ..................... 709/200 |
| 2007/0157311 A1* | 7/2007 | Meier et al. .................... 726/22 |
| 2007/0209075 A1* | 9/2007 | Coffman ......................... 726/23 |

* cited by examiner

PATTERN TRACKING AND CAPTURING HUMAN INSIGHT IN A WEB APPLICATION SECURITY SCANNER

FIELD OF THE INVENTION

The present invention relates network server security in general and in particular to web application security scanning.

BACKGROUND OF THE INVENTION

There are a number of different configurations of network client-server interfaces available today, but the most common network in use is the Internet, a global internetwork of networks and networks that use Internet protocols and/or interfaces, such as extranets, intranets, local services, and other variations. In the general case, to which inventions described herein apply, clients connect to servers over the network and clients are not always trusted computers. As a result, the designers of the servers need to ensure that untrusted clients cannot perform malicious acts or access unauthorized portions of the server through the network.

One approach to ensure that servers cannot be accessed in an unauthorized manner is to only provide access to secured and trusted clients. However, in many situations, that is not possible. For example, if a merchant was running an on-line store, the merchant would want to allow most anyone who has a computer to access the servers providing the on-line store functionality, but do so in a way that still prevents unauthorized interactions with the servers.

Server security is more than just requiring a username and password from each client before responding to client requests, since even a logged in user might try for unauthorized access and a typical service provided by a server might include content and functionality for use by unauthenticated and unlogged-in clients. One approach to server security is to review all of the code that runs on the server and verify that it does not include statements that allow for unauthorized activity and review all the files present on the server and their respective permissions, side-effects, etc. While this might be practical for a small installation, say an FTP server that serves up predefined files to all corners, it is often not practical with complex, interactive applications that have many response modes.

One common use of servers in this environment, but not an exclusive use, is that of a web application. As used herein, "web" refers to a collection of documents/files, some of which have references, or links, to other documents/files in the collection. One example of a web is the World Wide Web ("WWW"), a collection of files served up by WWW servers (also called "web servers") using HTTP protocols or something similar. The "WWW" gets its name from the fact that most of these documents/files can be almost anywhere in the world and can be accessed anywhere in the world where there is Internet connectivity.

A web application is an application that runs on one or more server and provides some functionality or service in response to client requests received over a network using web protocols (i.e., HTTP, HTTPS, or something similar). An example of a web application is a database interface, wherein a database runs on a database system and clients can access data in that database system by sending a request for service over the network to a web application server. The web application server receives the request for service and decides, according to how it is programmed, what to do with the request. It can ignore the request, send an error message back to the client, or trigger an operation with the database system and respond to the client's request by sending the client the results of the database operation.

In a highly specific example, suppose a client computer system is operated by a customer seeking to configure and purchase a laptop computer. The customer would direct the client computer system to access a web application server operated by a vendor of laptop computers. The client computer system might send a request to the web application server via the network requesting a home page of the vendor. The web application server might respond with a home page that includes features allowing the client to interact with content on the home page (such as by selecting from available model names, features, etc.), send a subsequent request to the server, etc.

All the while, the web application server is making decisions about what is appropriate to send and what is not appropriate to send, based on its programming. For example, if the client computer sends a request for an updated page with updated pricing for new options selected by the customer, the web application server might perform some calculations, perform some database look-ups, generate a new dynamic web page and return that web page to the client computer in response to the request. However, if the client computer sends a request to see data about what someone else ordered, or internal data from the database server, the web application should properly refuse to respond to the request.

Because web applications are so complex, securing a web application and testing for security vulnerabilities, often involves an automated testing of the web application. Client-side web application testing refers to tests that are run from a client's point of view. For example, a client-side test suite might have logic for logging in to a web application, applying valid and invalid requests to the web application, noting the web application's responses and evaluating those responses. For example, if the test suite sends a request to the web application for ordering products where the prices have been altered and the response is "invalid order", the test suite might note that the web application is secure in that regard, but if the response is "thank you for your order", the test suite might note that the web application is not secure.

While it is a simple matter for test personnel to look at the response that a web application sends to a request and determine whether the response was appropriate or indicates a security vulnerability, it is more difficult to program a system to automatically programmatically assess a response and determine whether it is a security vulnerability.

In view of the above, the inventions described herein provide improvements over existing approaches.

BRIEF SUMMARY OF THE INVENTION

Embodiments of the present invention provide for gathering human insights as to potential security vulnerabilities and structure data storage to contain data supporting recordations of those insights in such a way that later security scans can use that data to trigger an analysis by computer or human when conditions are met that represent the human insight.

In specific embodiments, apparatus and methods of managing vulnerability testing of a web application are provided for running a set of one or more scripted tests against a web application, recording results of the one or more scripted tests, providing an interface for a human evaluator to review the recorded results, and accepting from the human evaluator custom test parameters based on observations of the recorded results, wherein custom test parameters include at least one context usable by a future tester in deciding whether to run the custom test, and also includes at least one instruction for automatically running custom test steps of the custom test.

In a specific example, a test suite provides a tester with an interface to enter in details of a custom test of an application. Thus, when a tester is executing manual tests on a web application to test for potential security vulnerabilities and the tester notices some indicators of a potential weakness, the tester might perform additional tests, but might also enter a custom test record into the data storage for custom tests. A custom test record would be a recordation of elements of human insight. For example, if the tester noticed that a particular file is present in a web application at a particular URI and the tester assessed that the existence of the file and/or similarly named files may be of a security concern, the tester can create a custom test record that specifies a regular expression, for example, that matches the file's name and the names of the similarly named files, add comments as to the name of the custom test, human-readable comments about when the test should be run, why it should be run, what to look for, prior experience, etc. Then, when a later automated scan is being done, the regular expressions of the custom test records are compared to the requests the scanner is making and if there is a match, the scanner might alert the later tester and present the tester with the custom test record information so that the later tester can be prompted to decide to run that custom test.

The following detailed description together with the accompanying drawings will provide a better understanding of the nature and advantages of the present invention.

DETAILED DESCRIPTION OF THE INVENTION

An improved web application security scanner is described herein. A web application security scanner exercises a web application to find vulnerabilities and/or functional errors. For example a scanner might identify files on a web application server that are accessible but should not be, errors in web application logic, vulnerabilities wherein the web application accepts altered or unexpected inputs instead of responding with an error message.

The examples herein are not intended to be exhaustive, but describe embodiments of the present invention. Where individual items are shown, multiple items might be present, unless otherwise indicated. Where an indefinite number of items are shows or described, such as by parenthetical references to (1), (2), . . . , (n), the actual number is not limiting, unless otherwise specified. It should be noted that, unless otherwise indicated, the domain names used in the examples are not intended to refer to actual domains and any similarity is merely coincidental.

A web application test suite, or "test suite", performs tests against a web application by sending client requests from a testing computer to the server running the web application and checking how the web application responds. A thorough web application security scan might involve thousands of checks and responses. As a result, some sort of programmatic analysis is needed. A test suite might execute a Web Application Security Scan (WASS) by issuing a series or requests to a web application in the form of test URIs Uniform Resource Identifiers) and noting the responses made by the web application. URIs can be dynamic, wherein the page referenced by the URI does not exist until a request is made and responses might also be dynamic in that they are generated to be specific to a particular request.

Figure 1:
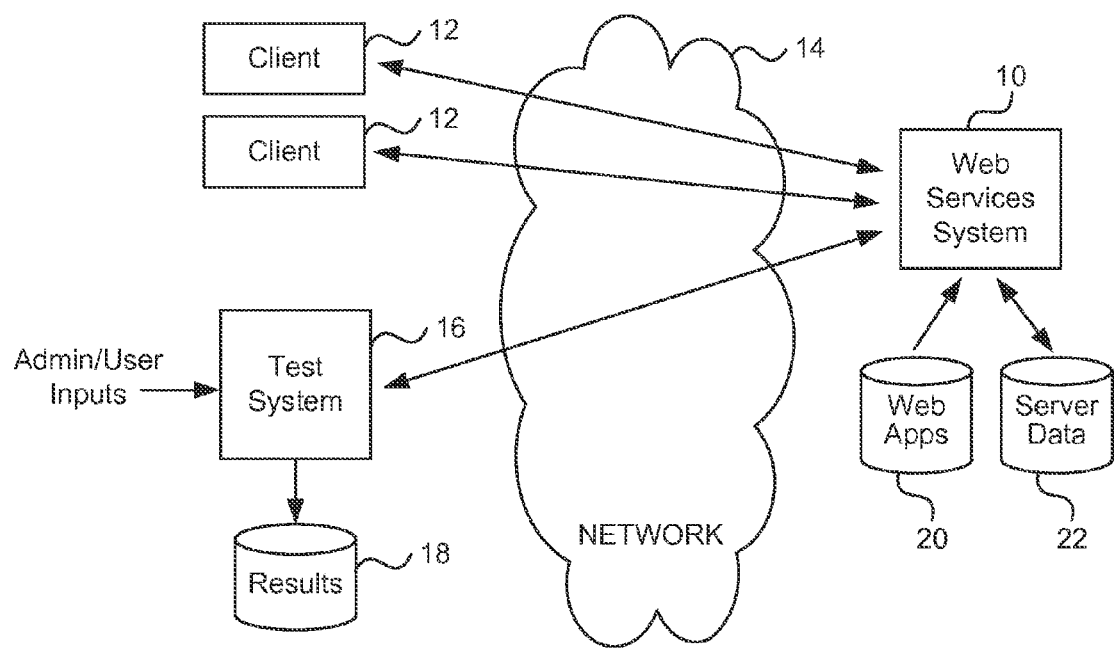
FIG. 1 is a block diagram illustrating a context of a test system according to aspects of the present invention.

FIG. 1 is a block diagram illustrating a context of a test system according to aspects of the present invention. As shown therein, a web services system 10 under test can be tested in the environment it normally operates in, such as an environment wherein clients 12 interact with web services system 10 over a network 14. A test system 16, which might be a programmed computer or software running on a multipurpose computer, can also interact with web services system 10 as if it were a client. Test system 16 generates results 18 usable for assessing whether web services system 10 provides any vulnerabilities and that are usable for an evaluator, such as a network security expert.

In particular, the operator of web services system 10 might be interested in vulnerabilities that allow outside entities or systems to access web applications 20 that are executed by web services system 10 or server data 22 that is maintained by web services system 10 and possibly used by web applications 20, where the access is in ways not expected by the designers of such systems that unnecessarily expose those systems. Other vulnerabilities or potential vulnerabilities might be in the presence of some file, data, parameter and/or feature that directly indicates a vulnerability, or suggests that it is worth testing for a vulnerability.

Figure 2:
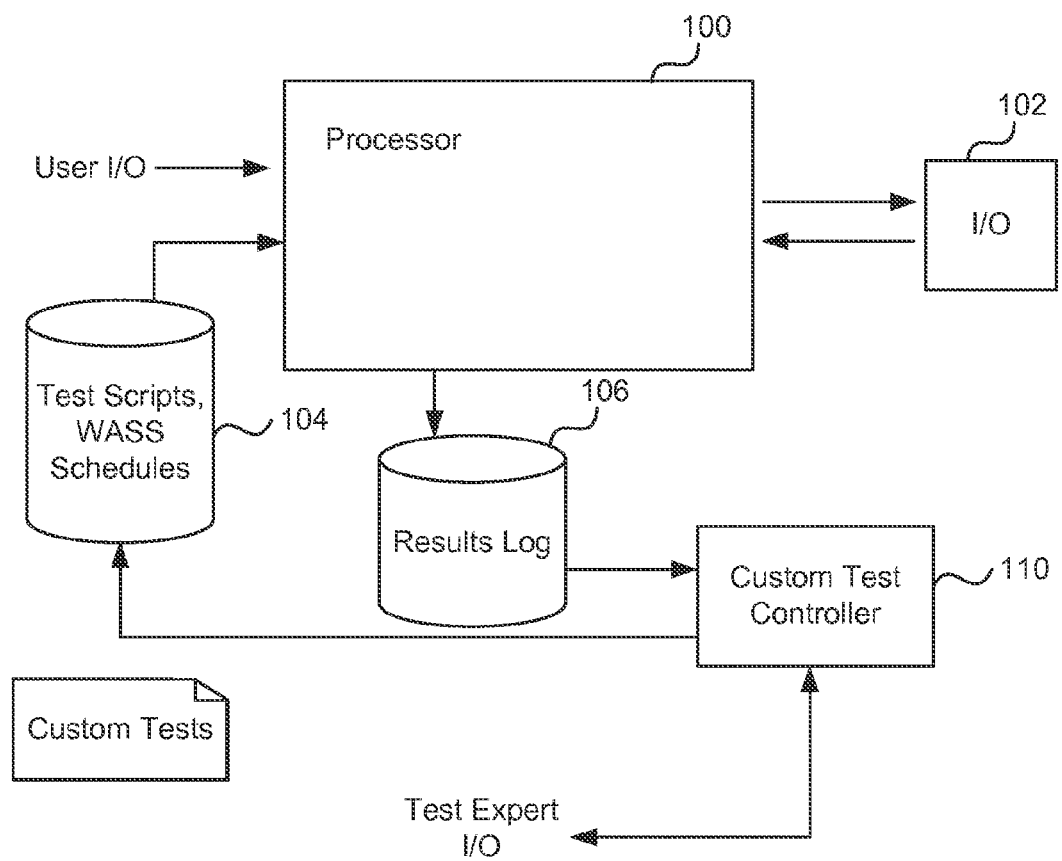
FIG. 2 is a block diagram illustrating details of the text system.

FIG. 2 is a block diagram of a test system shown in greater detail. As shown there, a processor 100 is programmed to read instructions and generate requests that an I/O section 102 sends to a web application and receives responses. In an example, processor 100 might issue an HTML request, an RFC request, a telnet request, an FTP request or the like by formatting a message and passing it to I/O section 102 that transmits the message over a network to an addressed server, service and/or system, which may return a response, which I/O section 102 might return to processor 100. It is well-known to use particular protocols to generate and transmit messages and requests and receive responses, so such details need not be mentioned here.

In an example test system, processor 100 might generate requests based on a reading of WASS schedules from storage 104, send those requests, and store the corresponding results in a results log file 106. Processor 100 might also run a test by executing a script representing that test. Processor 100 might process the results to determine vulnerabilities, but those might also be determined by a post-processor.

After a WASS schedule and/or test scripts are run, a test expert can use a custom test controller 110 to investigate the results, possibly using the expert's insight as to what to look for. If the expert determines that another test is warranted and/or useful in other situations, the expert can create a custom test that might then be stored in storage 104. A custom test might comprise more than just the test script needed to execute the test, but might include other information that informs later users of the test.

Figure 3:
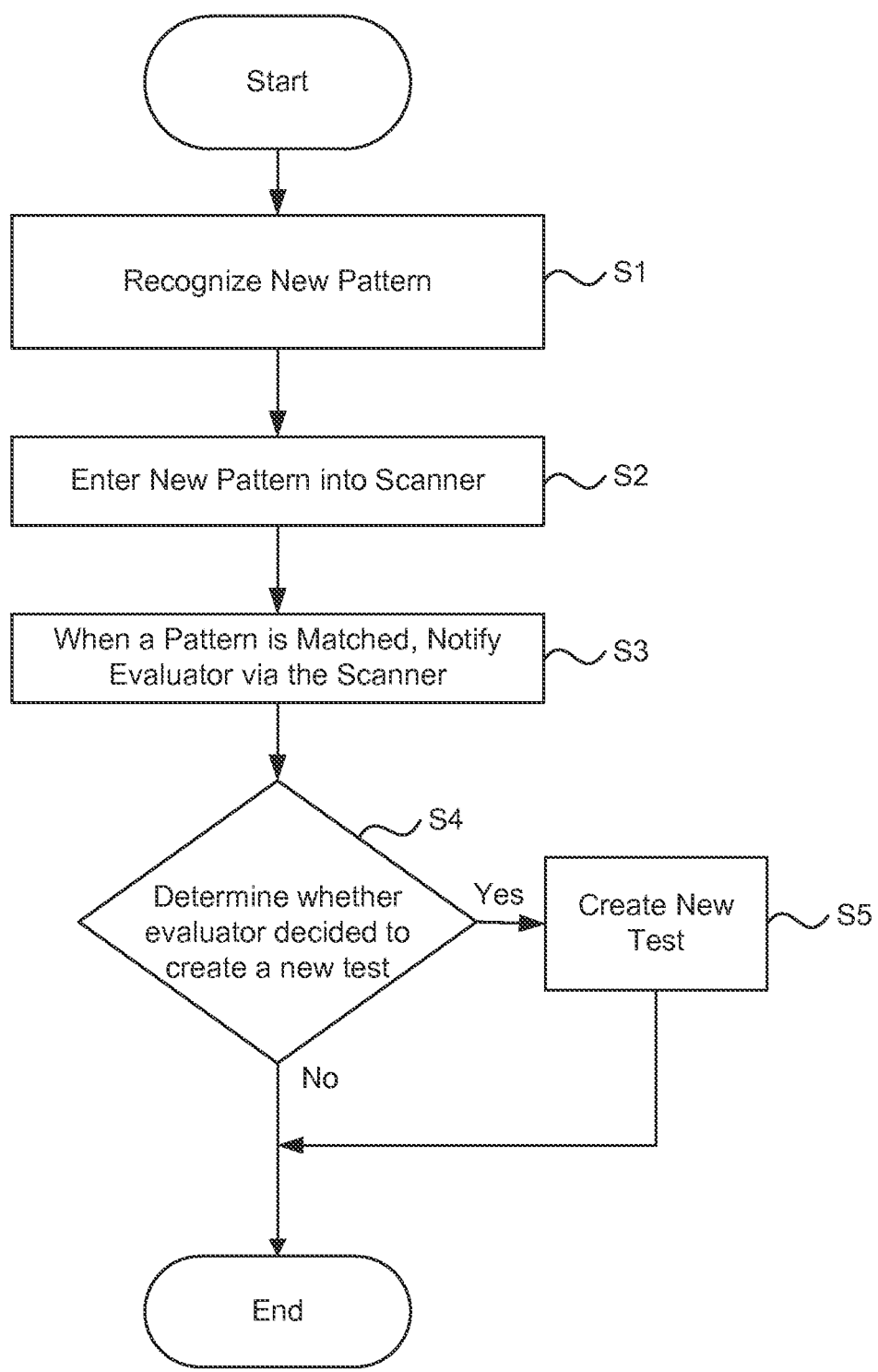
FIG. 3 is a flowchart of one process for handling custom tests.

An example of such a process is shown in FIG. 3, wherein a new pattern is recognized (S1), the pattern is entered into a scanner (S2) or stored such that the processor can use it, and when patterns are matched, the scanner can notify an evaluator (S3), who might choose (S4) to create a new test (S5).

In a specific example, a test suite provides a tester with an interface to enter in details of a custom test of an application. Thus, when a tester is executing manual tests on a web application to test for potential security vulnerabilities and the tester notices some indicators of a potential weakness, the tester might perform additional tests, but might also enter a custom test record into the data storage for custom tests. A custom test record would be a recordation of elements of human insight. For example, if the tester noticed that a particular file is present in a web application at a particular URI and the tester assessed that the existence of the file and/or similarly named files may be of a security concern, the tester can create a custom test record that specifies a regular expression, for example, that matches the file's name and the names of the similarly named files, add comments as to the name of the custom test, human-readable comments about when the test should be run, why it should be run, what to look for, prior experience, etc. Then, when a later automated scan is being done, the regular expressions of the custom test records are compared to the requests the scanner is making and if there is a match, the scanner might alert the later tester and present the tester with the custom test record information so that the later tester can be prompted to decide to run that custom test.

While performing a web application assessment, people recognize patterns in the web application that may lead them to perform further testing. The tester's insight might direct him or her to perform certain additional tests. For example, if a tester noticed that a file called "/private/big_secrets.txt" was accessible to a regular user, the tester might check the contents of the file, then look to see if any other files from the "/private" directory were similarly accessible. A later tester might of might not encounter that same file in another system, might not notice the file, and/or might not think to run the additional test of looking for files in the same directories. The system described herein allows for capturing these patterns, finding them during automated scans and suggesting possible tests to people engaged in the later assessment of the same systems, related systems or totally unrelated systems.

Patterns can be applied to all sites, some sites, or an individual site. Patterns can be regular expressions or some other form of pattern specification. Patterns might be in the form of a regular expression that matches all path/filenames of interest. A custom test record might include a pattern, test requests, commentary, and other elements. An example use of a custom test record is that a scanner checks files, requests and/or other data against the patterns of all or some of the custom test records. When there is a match, the scanner presents the commentary to the tester and suggests a number of test requests to make. Alternatively, the scanner can run some or all of the test requests and present those results with the commentary.

Custom tests can be applied to all sites, some sites, or an individual site. Once a custom test is created, it may be run once, a certain number of times, or during every scan. Custom tests might comprise a single pattern or multiple patterns. Custom tests might comprise a single request or multiple requests.

The patterns can be created by a group of one or more persons over time and accumulate in a collection of custom test records. The scanning system might provide maintenance features, so that custom tests that are never run are deleted to make room for other tests, to allow an administrator to alter custom test records to, for example, modify the regular expressions. Patterns and custom tests might be evaluated for accuracy and relevancy from time to time.

Patterns and custom tests that fail to meet certain requirements for relevance might be evaluated and if they are deemed to be irrelevant or incorrect they are removed from the data storage containing the custom test records.

While the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

What is claimed is:

1. A method of managing vulnerability testing of a web application, the method comprising:
   running a set of one or more scripted tests against a web application using a computer processor;
   recording results of the one or more scripted tests;
   providing an interface for a human evaluator to review the recorded results; and
   accepting from the human evaluator custom test parameters for a custom test record, wherein the custom test record includes indications of the custom test parameters for a custom test associated with the custom test record, and wherein at least some of the custom test parameters are based on observations of the recorded results, the custom test record including at least one context related to the recorded results and usable by a future tester in deciding whether to run the custom test, and also including a pattern in the web application recognized by the human evaluator and based on observations of the recorded results;
   automatically running a second scripted test against the web application or another web application using a computer processor, the second scripted test including a plurality of requests for service from the web application or the other web application, wherein running the second scripted test includes communicating at least one of the requests for service to the web application or the other web application; and
   comparing the at least one of request for service communicated to the web application or other web application to one or more of the custom test records previously created, wherein comparing comprises at least comparing the pattern included in the custom test parameters to determine whether or not the at least one request communicated to the web application or other web application matches the pattern of one or more of the custom tests.

2. The method of claim 1, wherein the custom test parameters include an indication of which web applications to run the custom test against or which class of web applications to run the custom test against.

3. The method of claim 1, further comprising:
   checking previously created custom tests for relevancy; and
   discarding irrelevant custom tests.

4. The method of claim 1, wherein at least some of the observations used by the human evaluator to decide to generate the custom test are stored in a context of the custom test.

5. The method of claim 1, further comprising presenting the at least one context included in the custom test parameters to the future tester if it is determined that there is a match between the at least one request communicated to the web application or other web application and the pattern included in the custom test parameters.

6. The method of claim 1, wherein the recorded results include an expression, and the custom test parameters include the same expression as the recorded results.

7. The method of claim 1, further comprising running the custom test if it is determined that there is a match between the at least one request communicated to the web application or other web application and the pattern included in the custom test parameters.

8. The method of claim 1, wherein the at least one context is related to indicators of potential weaknesses of the web application.

9. The method of claim 1, further comprising accepting from the human evaluator a test script for the custom test.

10. The method of claim 1, wherein the custom test parameters further include at least one instruction for running custom test steps of the custom test.

11. The method of claim 1, wherein the pattern in the web application is recognized as leading to a potential security vulnerability that may not be readily apparent to subsequent testers.

12. The method of claim 1, wherein the custom test parameters include a plurality of patterns obtained as a result of running and recording the results of a plurality of scripted tests, and the method further comprises comparing the at least one request for service communicated to the web application or other web application to the plurality of patterns to determine whether or not the at least one request communicated to the web application or other web application matches at least one of the plurality of patterns.

13. A computing device for managing vulnerability testing of a web application, the computing device comprising:
a computer processor configured to read machine-readable instructions from a tangible, non-transitory computer-readable medium, the machine-readable instructions comprising:
program code for running a set of one or more scripted tests against a web application;
program code for recording results of the one or more scripted tests;
program code for providing an interface for a human evaluator to review the recorded results; and
program code for accepting from the human evaluator custom test parameters for a custom test record, wherein the custom test record includes indications of the custom test parameters for a custom test associated with the custom test record, and wherein at least some of the custom test parameters are based on observations of the recorded results, the custom test record including at least one context related to the recorded results and usable by a future tester in deciding whether to run the custom test, and also including a pattern in the web application recognized by the human evaluator and based on observations of the recorded results;
program code for automatically running a second scripted test against the web application or another web application using a computer processor, the second scripted test including a plurality of requests for service from the web application or the other web application, wherein running the second scripted test includes communicating at least one of the requests for service to the web application or the other web application; and
program code for comparing the at least one request for service communicated to the web application or other web application to one or more of the custom test records previously created, wherein comparing comprises at least comparing the pattern included in the custom test parameters to determine whether or not the at least one request communicated to the web application or other web application matches the pattern of one or more of the custom tests.

14. The computing device of claim 13, wherein the custom test parameters include an indication of which web applications to run the custom test against or which class of web applications to run the custom test against.

15. The computing device of claim 13, wherein the machine-readable instructions further comprise:
program code for checking previously created custom tests for relevancy; and
program code for discarding irrelevant custom tests.

16. The computing device of claim 13, wherein at least some of the observations used by the human evaluator to decide to generate the custom test are stored in a context of the custom test.

17. The computing device of claim 13, wherein the machine-readable instructions further comprise:
program code for presenting the at least one context included in the custom test parameters to the future tester if it is determined that there is a match between the at least one request communicated to the web application or other web application and the pattern included in the custom test parameters.

18. The computing device of claim 13, wherein the recorded results include an expression, and the custom test parameters include the same expression as the recorded results.

19. The computing device of claim 13, wherein the machine-readable instructions further comprise program code for running the custom test if it is determined that there is a match between the at least one request communicated to the web application or other web application and the pattern included in the custom test parameters.

20. A non-transitory computer-readable medium tangibly embodying a program of machine-readable instructions executable by a digital processing apparatus having stored thereon instructions configured to manage vulnerability testing of a web application, the computer-readable medium being electronically readable, comprising:
program code for running a set of one or more scripted tests against a web application;
program code for recording results of the one or more scripted tests;
program code for providing an interface for a human evaluator to review the recorded results; and
program code for accepting from the human evaluator custom test parameters for a custom test record, wherein the custom test record includes indications of the custom test parameters for a custom test associated with the custom test record, and wherein at least some of the custom test parameters are based on observations of the recorded results the custom test record including at least one context related to the recorded results and usable by a future tester in deciding whether to run the custom test, and also including a pattern in the web application recognized by the human evaluator and based on observations of the recorded results;
program code for automatically running a second scripted test against the web application or another web application using a computer processor, the second scripted test including a plurality of requests for service from the web application or the other web application, wherein running the second scripted test includes communicating at least one of the requests for service to the web application or the other web application; and
program code for comparing the at least one request for service communicated to the web application or other web application to one or more of the custom test records previously created, wherein comparing comprises at least comparing the pattern included in the custom test parameters to determine whether or not the at least one request communicated to the web application or other web application matches the pattern of one or more of the custom tests.

21. The computer-readable medium of claim 20, wherein the custom test parameters include an indication of which web applications to run the custom test against or which class of web applications to run the custom test against.

22. The computer-readable medium of claim 20, further comprising:
   program code for checking previously created custom tests for relevancy; and
   program code for discarding irrelevant custom tests.

23. The computer-readable medium of claim 20, wherein at least some of the observations used by the human evaluator to decide to generate the custom test are stored in a context of the custom test.

24. The computer-readable medium of claim 20, further comprising:
   program code for presenting the at least one context included in the custom test parameters to the future tester if it is determined that there is a match between the at least one request communicated to the web application or other web application and the pattern included in the custom test parameters.

25. The computer-readable medium of claim 20, wherein the recorded results include an expression, and the custom test parameters include the same expression as the recorded results.

26. The computer-readable medium of claim 20, further comprising program code for running the custom test if it is determined that there is a match between the at least one request communicated to the web application or other web application and the pattern included in the custom test parameters.

* * * * *